United States Patent [19]

Ott et al.

[11] 3,902,430

[45] Sept. 2, 1975

[54] CONVEYOR SYSTEM

[75] Inventors: Robert C. Ott; Edward J. Carney, both of Bloomfield Hills, Mich.

[73] Assignee: American Chain & Cable Company, Inc., Bridgeport, Conn.

[22] Filed: Apr. 15, 1974

[21] Appl. No.: 460,733

[52] U.S. Cl......... 104/178; 104/172 R; 104/172 BT
[51] Int. Cl............................................. B61j 3/04
[58] Field of Search ...... 104/172 R, 172 B, 172 BT, 104/172 L, 170, 171, 165, 178, 179; 198/34

[56] References Cited
UNITED STATES PATENTS

| | | | |
|---|---|---|---|
| 3,262,397 | 7/1966 | Bradt........................ | 104/172 BT X |
| 3,349,718 | 10/1967 | Bradt et al................ | 104/172 BT X |

*Primary Examiner*—M. Henson Wood, Jr.
*Assistant Examiner*—Randolph A. Reese
*Attorney, Agent, or Firm*—Barnes, Kisselle, Raisch & Choate

[57] ABSTRACT

A conveyor system comprising a plurality of wheeled trucks, each of which has a tow pin extending downwardly in a slot in a floor that defines a track and along which a conveyor is moved. A bumper on each truck is adapted to be actuated upon engagement with an obstacle to energize a transmitter on the truck and direct a signal to a receiver along the track which thereupon de-energizes the conveyor interrupting the movement of all of the carriers. A light on the truck whose bumper has been actuated indicates the truck that has engaged the obstacle.

20 Claims, 5 Drawing Figures

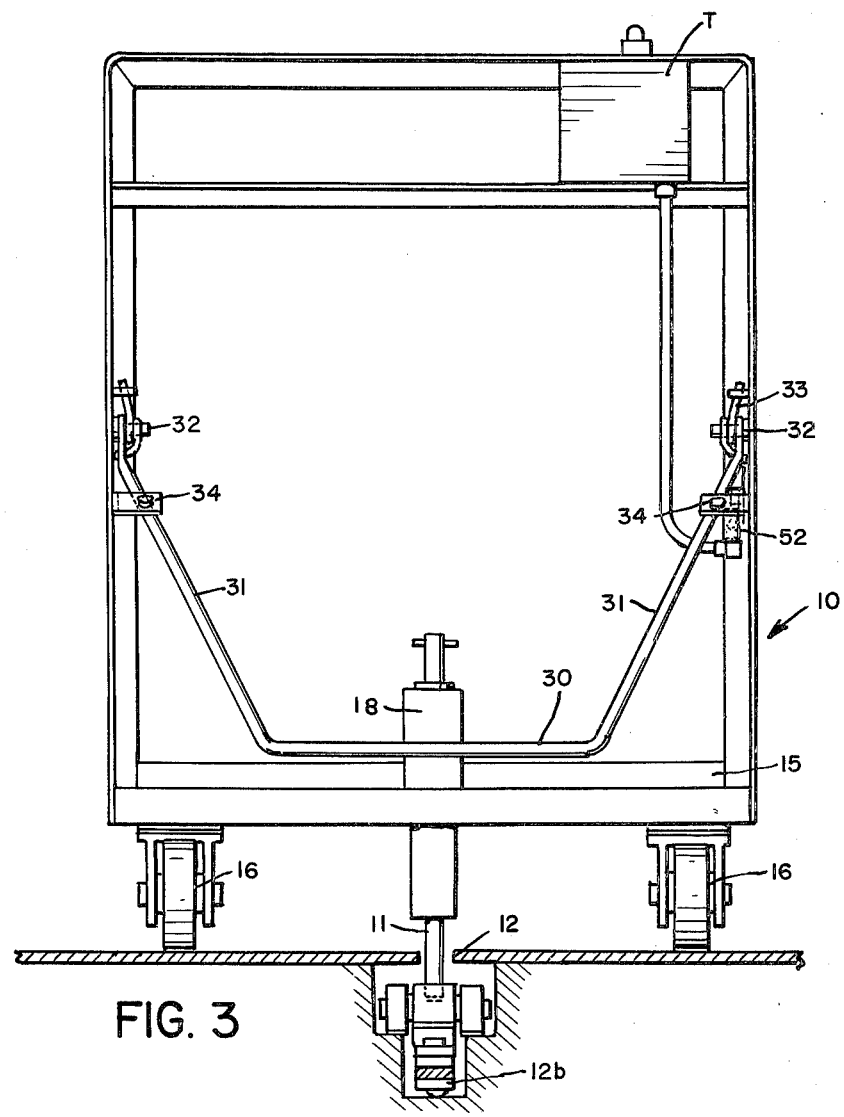
FIG. 3
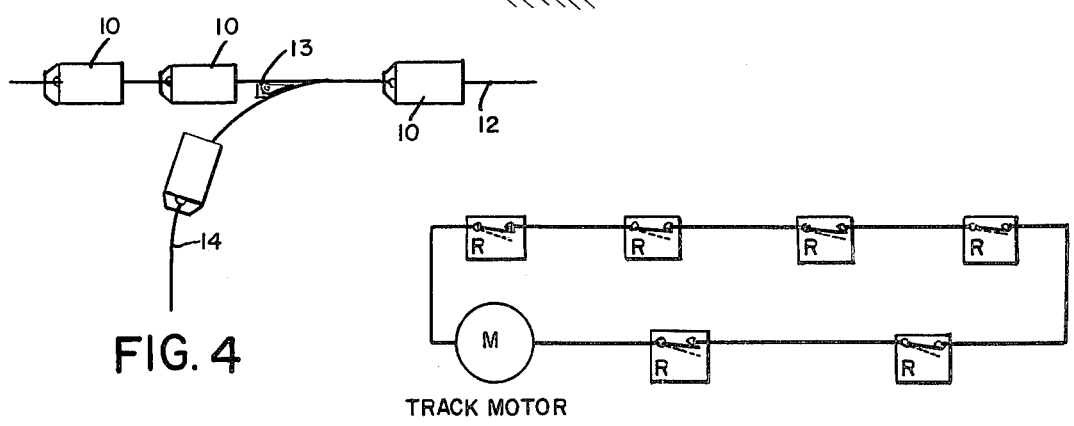
FIG. 4
FIG. 5

CONVEYOR SYSTEM

This invention relates to conveyor systems and particularly tow truck conveyor systems.

BACKGROUND OF THE INVENTION

In tow truck conveyor systems, a plurality of tow trucks are adapted to be moved along a slot in the floor by engagement of a tow pin on each tow truck with a conveyor beneath the floor. It has heretofore been suggested that the trucks be constructed so that they will accumulate when an obstacle is encountered. Conventionally, such a structure comprises a front bumper movably mounted on the front of each tow truck and interconnected with the tow pin so that when the bumper is moved rearwardly the tow pin will be lifted. As the front bumper of a leading truck encounters an obstacle, the front bumper moves rearwardly to lift the tow pin. It has also been conventional to cause the movement of the front bumper to move a rear bumper into position for engagement with the front bumper of a succeeding truck. As each succeeding truck approaches the first or leading truck, the front bumper thereof engages the rear of the leading truck to lift the tow pin of the succeeding truck.

One of the problems with respect to such systems is that complex mechanical linkages are required on the cart to effect lifting of the tow pin. These add to the initial cost as well as require substantial maintenance. In addition, in such a system, as each cart engages a preceding cart, it is disengaged and there is a possibility because of the momentum of each cart that its respective tow pin will move out of alignment with the slot in the floor and thereby will not re-engage the conveyor when the obstacle to the leading truck is removed.

Another problem with respect to such systems is that the operational characteristics are affected by the size of the load. As the loads become heavier, more force is required to withdraw the tow pin from the conveyor.

Another problem with respect to such systems is that when one cart stops, the remaining carts continue to operate and it is not possible to readily determine where the problem in the system exists so that it can be remedied.

Among the objects of the invention are to provide a system which obviates complex mechanical linkages; which insures continued engagement with the conveyor when the obstacle is remedied; and which readily indicates the area of the problem.

DESCRIPTION OF THE DRAWINGS

FIG. 3 is a fragmentary front sectional view of the system shown in FIG. 1.

FIG. 4 is a diagrammatic plan view of a portion of the system.

FIG. 5 is an electrical circuit diagram of another portion of the system.

DESCRIPTION

Figure 1:
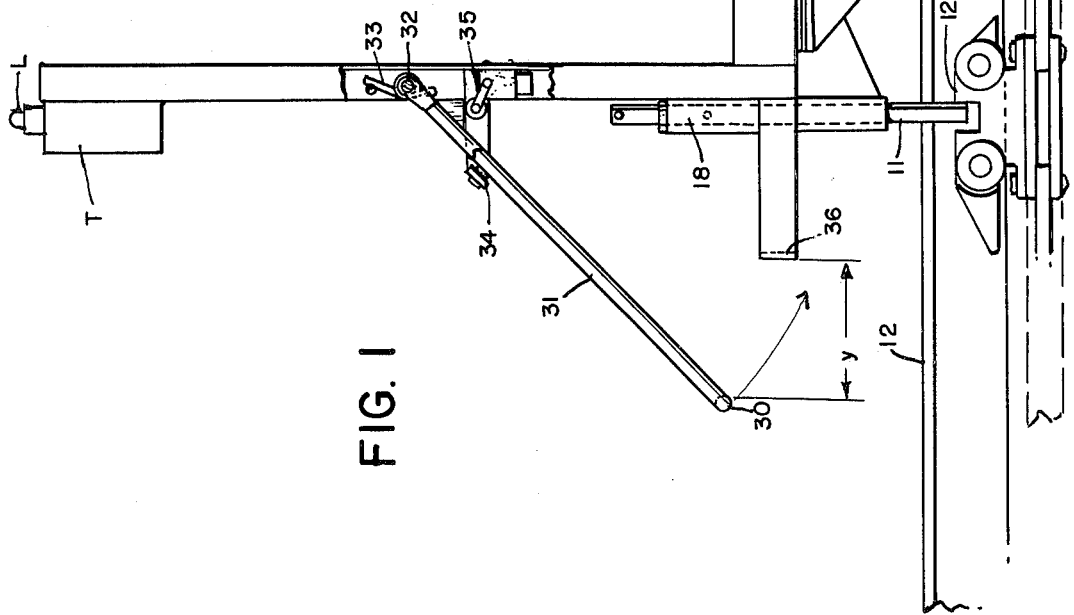
FIG. 1 is a fragmentary side elevational view of a system embodying the invention.

Referring to FIG. 1, the tow truck conveyor system comprises a plurality of carriers in the form of wheeled tow carts or trucks 10, each of which has a tow pin 11 that extends downwardly into a slot in the floor and is engaged by a lug 12a on a conveyor chain 12b beneath the floor to pull the tow truck along the slot. At points along the slot 12, switch tongues 13 can be provided for guiding the tow pin into spur tracks or slots 14 (FIG. 4). The spur tracks or slots may or may not be powered, that is, there may or may not be conveyors along the spur slots so that it might be necessary to push the truck through the spur line clear of the succeeding trucks which are passing along the main slot 12.

Figure 2:
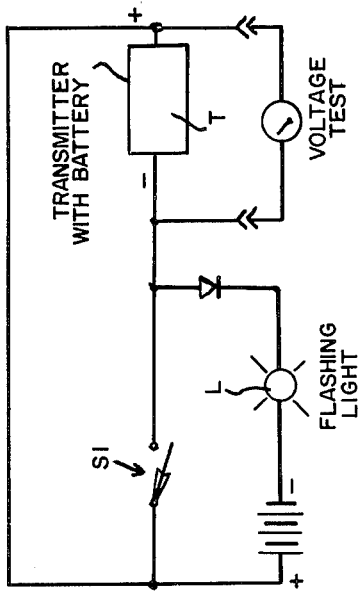
FIG. 2 is an electrical circuit diagram of a portion of the system.

Referring to FIGS. 2 and 3, the tow truck 10 comprises a body 15. Caster wheels 16 are provided at the front of the truck 10 and conventional wheels 17 are mounted on an axle which is mounted on brackets at the rear of the truck.

The tow pin 11 is mounted for vertical sliding movement at the front end of the truck in a bracket 18. The lower end of the tow pin extends downwardly through an elongated opening in bracket 18.

A movable bumper 30 having side arms 31 is pivoted at points 32 to the upright portion of the carrier or truck. A torsion spring 33 at each pivot yieldingly urges the bumper forwardly against stops 34. The cart includes a fixed front bumper 36 and a fixed rear bumper 37. The distance X that the rear bumper projects rearwardly is greater than the distance Y between the movable bumper 30 and front bumper 36.

When the bumper engages an obstacle, it closes the actuator 35 of manually resettable switch S1. This completes a circuit to a radio transmitter T on the carrier and a flashing light L on the carrier. As shown in FIG. 5, a series of radio receivers R in the circuit of the motor M that drives the conveyor are provided at longitudinally spaced points along the track. Transmitter T and receivers R are of the type used in control functions in garage door operating systems. In a typical example, the transmitter operates at 290–320 MHz utilizing a nine volt power source and the receivers operate ar 265–285 MHz with a 115 volt 60 Hz source.

When a cart encounters an obstacle the nearest receiver R to the truck receives a signal from the transmitter T to the truck that has encountered an obstacle and thereby interrupts the circuit to the motor M causing the conveyor to stop. In the event that the obstacle is removed, the switch S1, being a manually resettable switch, must be manually reset so that the system will not be re-activated when the obstacle is removed without correcting whatever difficulty there may have been to cause the obstacle to be present.

Since the tow pin is not disengaged, the entire conveyor system is de-energized, the position of each truck along the system is maintained so that when the conveyor is re-started, it is assured that each truck is at its proper position.

The advantages of stopping the entire conveyor when a cart contacts an obstruction in lieu of stopping the individual cart are as follows:

1. The lack of complex mechanical linkages on the cart to effect the lifting of the tow pin achieves several things:
   a. The necessary bumper travel to stop the cart is minimized in that it is not related to a minimum up travel on the tow pin.
   b. The force required to operate the bumper can be substantially reduced since lifting the tow pin is not a requirement.
   c. Maintenance is reduced.
   d. Initial cost of the carts is reduced.

2. Stopping of the entire system permits the use of only a simple bumper on the front of the cart and yet permits the use of non-powered spurs off of the main line. Heretofore, a multiple cart bumper system was necessary if more than a single cart was required to stop upon contact with an obstruction.

The stopping of only the first cart to contact an obstruction could result in less than a desirably "safe" condition if the following cart was not stopped when contacting the stopped cart.

3. By stopping the entire system with each cart in its own pusher dog, a "slug" of carts is not created behind the obstruction.

If a slug of carts were to be created, it would necessitate extensive manual assistance to clear at the time of return to normal operation.

4. By not tying the bumper to the tow pin, the operational characteristics of the bumper are unaffected by heavy loads on the cart; i.e. the friction force of the tow pin on the face of the pusher does not affect the bumper operation. The conventional accumulating type bumpers which withdraw the tow pin from the pusher requires varying forces relating to the load on the cart. As the loads become heavier, more force is required to withdraw the tow pin from the conveyor. In this particluar invention, the tow pin is not withdrawn, but the actuating device merely sends a signal to stop the conveyor.

5. By stopping the conveyor and not the carts, an immediate indication of the problem is visible. This can substantially contribute to the continued proper operation of the system which is of prime importance to the user.

6. With a brake on the conveyor drive or drives, the conveyor can be made to stop for all practical purposes immediately. Since the tow pin is not disengaged from the conveyor, the conveyor will absorb the kinetic energy of the cart which would normally be "freewheeling" to proceed to contact personnel or objects in its' path until all of the kinetic energy and motion of the cart was absorbed. In this respect, it is important to note that by mechanically braking the cart motion through the conveyor, motion of the cart is eliminated when the conveyor stops. Although there have been carts designed and on the market place which have brakes on the carts, the force to actuate the stopping or accumulating bumper varies considerably with the load imposed on the cart as well as the complexity of linkages required to set brakes on the carts themselves.

Although the invention has been described as applied to push-off tow truck conveyor systems, it can also be added to carts of standard switching or non-switching systems for protection against inanimate or animate obstacles in the path of the carts. The invention may also be applied to other systems such as overhead tow cart systems, and power and free conveyor systems.

We claim:

1. The combination comprising
   an article carrier,
   a track along which said carrier is adapted to be moved,
   conveyor means along said track,
   means for driving said conveyor,
   means on the carrier movable to and from a position of operative engagement with said conveyor means,
   proximity sensing means on the carrier for sensing the presence of an obstacle in the path of the carrier,
   transmitter means on the carrier responsive to actuation of the proximity sensing means for transmitting a radio signal,
   receiver means positioned remotely from said carrier in proximity to the track for receiving a signal from said radio transmitter means and de-energizing said conveyor drive means in response to said signal.

2. The combination set forth in claim 1 wherein said proximity sensing means comprises a bumper movably mounted on said carrier and adapted to be engaged by an obstacle in the path of the carrier.

3. The combination set forth in claim 2 wherein said proximity sensing means includes switch means actuated by said bumper upon engagement with an obstacle.

4. The combination comprising
   an article carrier,
   a track along which said carrier is adapted to be moved,
   conveyor means along said track,
   means for driving said conveyor,
   means on the carrier movable to and from a position of operative engagement with said conveyor means,
   proximity sensing means on the carrier for sensing the presence of an obstacle in the path of the carrier,
   transmitter means on the carrier responsive to actuation of the proximity sensing means for transmitting a signal,
   receiving means positioned in proximity to the track for receiving a signal from said transmitter means and de-energizing said conveyor drive means in response to said signal,
   and signal means on said carrier actuated by said proximity sensing means for producing a visual signal of the carrier.

5. The combination set forth in claim 4 wherein said signal means comprises illuminating means.

6. The combination comprising
   an article carrier,
   a track along which said carrier is adapted to be moved,
   conveyor means along said track,
   means for driving said conveyor,
   means on the carrier movable to and from a position of operative engagement with said conveyor means,
   proximity sensing means on the carrier for sensing the presence of an obstacle in the path of the carrier,
   transmitter means on the carrier responsive to actuation of the proximity sensing means for transmitting a signal,
   receiving means positioned in proximity to the track for receiving a signal from said transmitter means and de-energizing said conveyor drive means in response to said signal,
   means for preventing re-energization of said conveyor drive means upon de-actuation of said proximity sensing means.

7. The combination set forth in claim 6 including a manual reset means for re-energizing said means for preventing re-energization.

8. The combination comprising
a tow truck,
a floor defining a track along which said truck is adapted to be moved,
a slot in said floor,
conveyor means along said slot,
means for driving said conveyor,
a tow pin on the truck movable through said slot to and from a position of operative engagement with said conveyor means,
proximity sensing means on the truck for sensing the presence of an obstacle in the path of the truck,
transmitter means on the truck responsive to actuation of the proximity sensing means for transmitting a radio signal,
receiver means positioned remotely from said truck in proximity to the track for receiving a radio signal from said transmitter means and de-energizing said conveyor drive means in response to said signal.

9. The combination set forth in claim 8 wherein said proximity sensing means comprises a bumper movably mounted on said truck and adapted to be engaged by an obstacle in the path of the truck.

10. The combination set forth in claim 9 wherein said proximity sensing means includes switch means actuated by said bumper upon engagement with an obstacle.

11. The combination comprising
a tow truck,
a floor defining a track along which said truck is adapted to be moved,
a slot in said floor,
conveyor means along said slot,
means for driving said conveyor,
a tow pin on the truck movable through said slot to and from a position of operative engagement with said conveyor means,
proximity sensing means on the truck for sensing the presence of an obstacle in the path of the truck,
transmitter means on the truck responsive to actuation of the proximity sensing means for transmitting a signal,
receiving means positioned in proximity to the track for receiving a signal from said transmitter means and de-energizing said conveyor drive means in response to said signal,
and signal means on said carrier actuated by said proximity sensing means for producing a visual signal of the truck.

12. The combination set forth in claim 11 wherein said signal means comprises illuminating means.

13. The combination set forth in claim 12 including means for preventing re-energization of said conveyor drive means upon de-actuation of said proximity sensing means.

14. The combination set forth in claim 13 including a manual reset means for re-energizing said means for preventing re-energization.

15. For use with an article carrier, a track along which said carrier is adapted to be moved,
means for driving said conveyor, the improvement comprising
conveyor means along said track,
means on the carrier movable to and from a position of operative engagement with said conveyor means,
transmitter means adapted to be mounted on the carrier responsive to actuation of a bumper of the proximity sensing means for transmitting a radio signal,
receiver means adapted to be positioned in proximity to the track for receiving a radio signal from said transmitter means and de-energizing said conveyor drive means in response to said signal.

16. For use with an article carrier, a track along which said carrier is adapted to be moved,
means for driving said conveyor, the improvement comprising
conveyor means along said track,
means on the carrier movable to and from a position of operative engagement with said conveyor means,
transmitter means adapted to be mounted on the carrier responsive to actuation of a bumper of the proximity sensing means for transmitting a signal,
receiver means adapted to be positioned in proximity to the track for receiving a signal from said transmitter means and de-energizing said conveyor drive means in response to said signal,
and signal means adapted to be mounted on said carrier and actuated by said bumper for producing a visual signal of the carrier.

17. For use with an article carrier, a track along which said carrier is adapted to be moved,
means for driving said conveyor, the improvement comprising
conveyor means along said track,
means on the carrier movable to and from a position of operative engagement with said conveyor means,
transmitter means adapted to be mounted on the carrier responsive to actuation of a bumper of the proximity sensing means for transmitting a signal,
receiving means adapted to be positioned in proximity to the track for receiving a signal from said transmitter means and de-energizing said conveyor drive means in response to said signal,
and means adapted to be mounted on said carrier for preventing re-energization of said conveyor drive means upon de-actuation of said proximity sensing means.

18. The combination comprising
a plurality of tow trucks,
a floor defining a track along which said plurality of trucks are adapted to be moved,
a slot in said floor,
conveyor means along said slot,
means for driving said conveyor,
a tow pin on each said truck movable through said slot to and from a position of operative engagement with said conveyor means,
proximity sensing means on each truck independent of said tow pin for sensing the presence of an obstacle in the path of the truck,
transmitter means on each truck responsive to actuation of the proximity sensing means for transmitting a radio signal,
receiver means positioned in proximity to the track for receiving a radio signal from said transmitter means and de-energizing said conveyor drive means in response to said signal such that the movement of said trucks is interrupted even though the tow pins of said trucks are in operative engagement with said conveyor means.

19. The combination set forth in claim 18 including means for preventing re-energization of said conveyor drive means upon de-actuation of said proximity sensing means and manual reset means for permitting energization.

20. The method of controlling an article carrier which is movable along a track by engagement through disengageable means with a conveyor movable along said track, causing the carrier to transmit a radio signal upon movement of said carrier into proximity with an obstacle, and interrupting the movement of said conveyor in response to said transmitted signal.

* * * * *